(12) United States Patent
Koenigs et al.

(10) Patent No.: US 12,435,015 B2
(45) Date of Patent: Oct. 7, 2025

(54) METHODS FOR REDUCING FOULING IN UPGRADING REACTORS

(71) Applicant: Dow Global Technologies LLC, Midland, MI (US)

(72) Inventors: David Koenigs, Pearland, TX (US); Sean W. Ewart, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 907 days.

(21) Appl. No.: 17/631,181

(22) PCT Filed: Jul. 7, 2020

(86) PCT No.: PCT/US2020/040997
§ 371 (c)(1),
(2) Date: Jan. 28, 2022

(87) PCT Pub. No.: WO2021/021394
PCT Pub. Date: Feb. 4, 2021

(65) Prior Publication Data
US 2022/0185745 A1    Jun. 16, 2022

Related U.S. Application Data

(60) Provisional application No. 62/880,350, filed on Jul. 30, 2019.

(51) Int. Cl.
*C07C 7/20* (2006.01)
*C07C 2/36* (2006.01)
*C08F 10/02* (2006.01)

(52) U.S. Cl.
CPC ............... *C07C 2/36* (2013.01); *C08F 10/02* (2013.01); *C07C 2531/14* (2013.01); *C07C 2531/18* (2013.01); *C07C 2531/22* (2013.01)

(58) Field of Classification Search
CPC ....................................................... C07C 2/08
See application file for complete search history.

(56) References Cited

U.S. PATENT DOCUMENTS

| 8,227,653 B2 * | 7/2012 | Weber ............... C08F 2/005 526/75 |
| 2012/0016097 A1 | 1/2012 | Weber et al. |
| 2018/0154344 A1 | 6/2018 | Klosin et al. |
| 2019/0308158 A1 * | 10/2019 | Park ................ C08L 91/06 |

FOREIGN PATENT DOCUMENTS

| CN | 106458787 A | 2/2017 |
| CN | 107690441 A | 2/2018 |
| WO | 2010/110801 A1 | 9/2010 |
| WO | 2018/174390 A1 | 9/2018 |

OTHER PUBLICATIONS

161/162 Communication for Application No. 20743555.3 Issued Mar. 9, 2022, pp. 1-3.
International Search Report & Written Opinion issued in corresponding PCT Application No. PCT/US2020/040997, mailed on Oct. 1, 2020.
Brazil Technical Report dated Aug. 7, 2024, pertaining to BR Patent Application No. BR112022001560.7, 7 pgs.
Saudi Arabian Examination Report dated Feb. 19, 2025, pertaining to SA Patent Application No. 522431525, 18 pgs.
Canadian Office Action dated Jul. 15, 2025, pertaining to CA Patent Application No. 3,145,059, 4 pgs.

* cited by examiner

*Primary Examiner* — Catherine S Branch
(74) *Attorney, Agent, or Firm* — Dinsmore & Shohl LLP

(57) ABSTRACT

A method for reducing fouling in an oligomerizing reactor that includes upgrading $C_2$ to $C_4$ hydrocarbons within the oligomerizing reactor in the presence of a fouling inhibitor having a particle size $D_{50}$ of less than 100 μm and forming linear alpha olefins and polymer during the oligomerizing, wherein the fouling inhibitor changes the morphology of the polymer.

15 Claims, No Drawings

METHODS FOR REDUCING FOULING IN UPGRADING REACTORS

CROSS-REFERENCE TO RELATED APPLICATIONS

This application is a National Stage Entry under 35 U.S.C. § 371 of International Patent Application No. PCT/US2020/040997, filed Jul. 7, 2020, which claims priority to U.S. Provisional Patent Application No. 62/880,350, filed on Jul. 30, 2019, the entire disclosures of both of which are hereby incorporated by reference.

BACKGROUND

Field

The present specification generally relates to methods for reducing fouling and oligomerization reactors using a fouling inhibitor. In particular, the present specification relates to methods that reduce fouling by changing the morphology of the polymer formed within the reactor.

Technical Background

Feedstock hydrocarbons are often upgraded before being used as a commercially valuable product, such as olefins. Tetramerization is one such oligomerization process, where at least 30% 1-octene is produced from ethylene in the oligomerization process. When carrying out a process for tetramerization of ethylene, the aim is to choose a catalyst system and adjust process conditions in order to produce the maximum amount of 1-octene. 1-Hexene is also typically coproduced in a tetramerization process and higher temperatures shift the selectivity from 1-octene towards 1-hexene. This is a further issue to consider when operating a tetramerization process at higher temperatures.

The formation of a high molecular weight polymer byproduct by a Cr-based ethylene tetramerization catalyst may present a major technical challenge when commercializing an ethylene tetramerization process as polymer fouling reduces plant run time and necessitates shut-downs due to blockages and difficult temperature control. When running tetramerization processes at reaction temperatures less than 100° C., the polymer precipitates out of solution in the reactor, which brings risk to the process due to the possibility of reactor or downstream equipment fouling.

Accordingly, a need exists for methods for reducing fouling in oligomerization reactors. Such fouling reduction would provide benefits including, but not limited to, reducing/minimizing process down time, more efficiently and/or cost effectively producing desired products, reducing reaction byproducts, and/or to reducing/minimizing inefficiencies associated with start-ups and shutdowns, among other benefits.

SUMMARY

According to embodiments of the present disclosure, a method for reducing fouling in an oligomerization reactor includes oligomerizing $C_2$ to $C_4$ hydrocarbons within the oligomerization reactor in the presence of a fouling inhibitor having a particle size $D_{50}$ of less than 100 microns (μm) and forming linear alpha olefins and polymer during the oligomerization, wherein the fouling inhibitor changes the morphology of the polymer.

According to embodiments of the present disclosure, a method for reducing fouling in an oligomerization reactor includes oligomerizing ethylene within the oligomerization reactor in the presence of a fouling inhibitor having a particle size $D_{50}$ of less than 100 μm and forming linear alpha olefins and polyethylene during the oligomerization, wherein the fouling inhibitor changes the morphology of the polyethylene and reduces the propensity of the polyethylene to foul the reactor.

Additional features and advantages will be set forth in the detailed description which follows, and in part will be readily apparent to those skilled in the art from that description or recognized by practicing the embodiments described herein, including the detailed description which follows, as well as the claims.

It is to be understood that both the foregoing general description and the following detailed description describe various embodiments and are intended to provide an overview or framework for understanding the nature and character of the claimed subject matter.

DETAILED DESCRIPTION

Reference will now be made in detail to embodiments of methods for reducing fouling in oligomerization reactors where $C_2$ to $C_4$ hydrocarbons are upgraded.

In embodiments, a method for reducing fouling in an oligomerization reactor includes oligomerizing $C_2$ to $C_4$ hydrocarbons within the oligomerization reactor in the presence of a fouling inhibitor having a particle size $D_{50}$ of less than 100 μm and forming linear alpha olefins and polymer (polyolefin) during the oligomerization, wherein the fouling inhibitor changes the morphology of the polymer and reduces the propensity of the polyolefin to foul the reactor.

In embodiments, oligomerizing $C_2$ to $C_4$ hydrocarbons includes oligomerizing ethylene, butadiene, or both.

The method includes oligomerizing $C_2$ to $C_4$ hydrocarbons to linear alpha olefins. During this oligomerization process, polymer may form as a byproduct of the oligomerization reactions. In embodiments, the polymer may include polyethylene. Linear alpha olefins are olefins or alkenes with a chemical formula of $C_xH_{2x}$, which is distinguished from other mono-olefins with a similar molecular formula by linearity of the hydrocarbon chain and the position of the double bond at the primary position. Linear alpha olefins may include 1-butene, 1-hexene, 1-octene, 1-decene, 1-dodecene, 1-tetradecene, 1-hexadecene, 1-octadecene, or combinations of these. In embodiments, the linear alpha olefins include 1-hexene, 1-octene, or both. In embodiments, the linear alpha olefins include 1-octene.

In embodiments, oligomerizing ethylene includes converting the ethylene to 1-hexene, 1-octene, or combinations thereof. The oligomerization may be carried out using any ethylene trimerization or tetramerization technology known in the art, including temperatures from −100° C. to 300° C. and pressures from atmospheric to 3000 atmospheres (303.9 MPa). Suspension, solution, slurry, gas phase, or high-pressure oligomerization processes may be utilized with the methods disclosed herein. Such processes can be run in a batch, semi-batch, or continuous mode.

Suitable activators for the oligomerization reaction may include aluminoxanes such as methylaluminoxane (MAO), ethylaluminoxane (EAO), trimethylaluminum (TMA), trethylaluminum (TEA), isobutylaluminoxane, and modified methylaluminoxanes (MMAO), which include alkyl groups other than methyl such as ethyl, isobutyl, and n-octyl, such as MMAO-3A. Alkylaluminoxanes and modified alkylaluminoxanes are suitable as catalyst activators, particularly when the abstractable ligand of the catalyst is a halide, alkoxide, or amide. Mixtures of different aluminoxanes and modified aluminoxanes may also be used.

In embodiments, chromium-containing catalysts may be used, such as those disclosed in U.S. Patent Application Publication 2018/0154344A1, which is herein incorporated by reference. As nonlimiting examples, the chromium-containing catalysts may include Cr/bis(phosphino)amine (PNP), chromium tri (acetylacetonate)aluminoxane-activated chromium/$((R^2)_2P)_2NR$, preformed PNP-Cr(III) complexes such as $(Ph_2P)_2N$—(Ph)—Cr(III), or combinations thereof. In embodiments, the chromium-containing catalysts may include $CrCl_3$ $(THF)_3$ (trichlorotris(tetrahydrofuran) chromium), $CrBr_3$ $(THF)_3$, $CrI_3$ $(THF)_3$, $CrCl_3$, $CrBr_3$, $CrI_3$, $CrCl_2$, $CrCl_2$ $(THF)_2$, $Cr(acac)_3$, (chromium (III) acetylacetonate), $Cr(acetate)_3$ (chromium (III) acetate), Cr(2-ethylhexanoate)$_3$ (chromium (III)$_2$-ethylhexanoate), $(THF)_3$ $CrMeCl_2$, $(Mes)_3Cr(THF)$, $((TFA)_2Cr(OEt)_2)_2$, $(THF)_3$ $CrPh_3$, $Cr(NMe_3)_2Cl_3$, $Cr(neopentyl)_3$ $(THF)_3$, $Cr(CH_2$—$C_6H_4$—O—$NMe)_3$, $Cr(TFA)_3$, $Cr(CH(SiMe_3)_2)_3$, $Cr(Mes)_2$ $(THF)_3$, $Cr(Mes)_2$ (THF) $Cr(Mes)_2$ $(THF)_2$, $Cr(Mes)$ CI $(THF)_2$, $Cr(Mes)$ CI $(THF)_{0.5}$, $Cr(p$-tolyl) $Cl_2$ $(THF)_3$, $Cr(diisopropylamide)_3$, $Cr(picolinate)_3$, $CrCl_2$ $(THF)_2$, $Cr(NO_3)_3$, $Cr(hexafluoroacetylacetonato)_3$, $(THF)_3Cr(\eta^2$-2,2"biphenyl) Br, $Cr(CO)_6$, $Cr(CO)_3$ $(THF)_3$, $Cr(CO)_3$ $(NCCH_3)_3$, (benzene) $Cr(CO)_3$, (toluene) $Cr(CO)_3$ and mixtures thereof. In the foregoing formulae, "Mes" means mesityl or 2,4,6-trimethylphenyl, "TFA" means trifluoroacetate and "acac" means acetylacetonato.

Suitable solvents and/or diluents for oligomerization may include non-coordinating, inert liquids. Examples include, but are not limited to, mineral oil; straight and branched-chain hydrocarbons, such as propane, isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; perhalogenated hydrocarbons such as perfluorinated $C_{4-10}$ alkanes; chlorobenzenes; and aromatic and alkylsubstituted aromatic compounds, such as benzene, toluene, mesitylene, and xylene. Suitable solvents and/or diluents may additionally or alternately include liquid olefins, which may act as monomers or comonomers, including, but not limited to, ethylene, propylene, 1-butene, 1-pentene, 3-methyl-1-pentene, 4-methyl-1-pentene, 1-decene, and mixtures thereof. Other additives may be included, such as scavengers, promoters, modifiers, reducing agents, oxidizing agents, dihydrogen, aluminum alkyls, and/or silanes.

In embodiments, the ethylene may be upgraded by a tetramerization process. In embodiments, the tetramerization process may be represented by the reaction mechanism below:

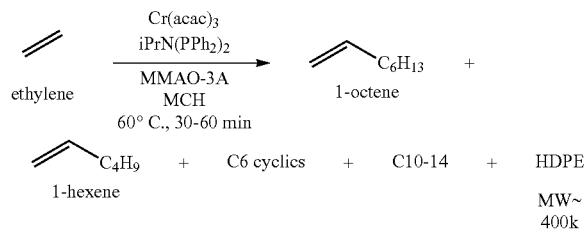

In embodiments, the oligomerization reactor may operate at a temperature of less than 200° C., less than 150° C., less than 100° C., less than 85° C., less than 80° C., less than 75° C., less than 70° C., less than 65° C., less than 60° C., less than 55° C., or less than 50° C. In embodiments, the oligomerization reactor may operate at a temperature of less than 85° C. In embodiments, the oligomerization reactor may operate at a temperature of less than 70° C. In embodiments, the ethylene tetramerization reaction may occur at temperatures of less than 70° C., less than 65° C., less than 60° C., less than 55° C., or less than 50° C.

In embodiments, the oligomerization reactor may operate at temperatures below the melting point of the polymer formed during the oligomerization process. At temperatures below the melting point of the polymer, the polymer formed as a byproduct during the reaction may precipitate in the reactor. The precipitated polymer that sticks to the walls or other surfaces within the reactor without easily flowing out is referred to as "fouling polymer." In other words, fouling polymer is polymer that not only has become insoluble in the oligomerization reaction medium under oligomerization conditions, but also has deposited on one or more surfaces within the oligomerization reactor. The one or more surfaces within the oligomerization reactor may include the walls of the reactor as well as surfaces of other implements inside the reactor (e.g., impellers, baffles, and the like), such that the fouling/fouled polymer remains within the reactor (i.e., does not exit the reactor during the ordinary course of the reaction).

The methods disclosed herein include oligomerizing in the presence of a fouling inhibitor, which may change the morphology of the polymer formed as a byproduct in the oligomerization process, thereby reducing the propensity of the polymer to foul the reactor. At reaction temperatures greater than the melting point of the polymer, the amount of polymer byproduct typically increases, reducing the yield of the alpha-olefin products, as well as increasing the degree of reactor fouling, which is undesired. Additionally, in embodiments where the oligomerization process includes ethylene oligomerization, the $C_8/C_6$ ratio decreases at reaction temperatures greater than the melting point of the polymer, which is also typically undesired during $C_8$ production.

Therefore, in embodiments, the methods disclosed herein are directed towards reducing fouling in an oligomerization reactor that operates at a temperature less than the melting point of the polymer formed in the oligomerization reaction. In embodiments, the melting point of the polymer formed in the oligomerization reaction may be greater than 80° C., greater than 100° C., greater than 110° C., greater than 115° C., greater than 120° C., greater than 125° C., greater than 130° C., greater than 135° C., greater than 140° C., greater than 145° C., or greater than 150° C. In embodiments, the melting point of the polymer formed in the oligomerization reaction may be range from 80° C. to 150° C., from 80° C. to 145° C., from 80° C. to 140° C., from 80° C. to 135° C., from 80° C. to 130° C., from 80° C. to 125° C., from 80° C. to 120° C., from 80° C. to 115° C., from 80° C. to 110° C., from 80° C. to 100° C., from 100° C. to 150° C., from 100° C. to 145° C., from 100° C. to 140° C., from 100° C. to 135° C., from 100° C. to 130° C., from 100° C. to 125° C., from 100° C. to 120° C., from 100° C. to 115° C., from 100° C. to 110° C., from 110° C. to 150° C., from 110° C. to 145° C., from 110° C. to 140° C., from 110° C. to 135° C., from 110° C. to 130° C., from 110° C. to 125° C., from 110° C. to 120° C., from 110° C. to 115° C. from 115° C. to 150° C., from 115° C. to 145° C., from 115° C. to 140° C., from 115° C. to 135° C., from 115° C. to 130° C., from 115° C. to 125°

C., from 115° C. to 120° C., from 120° C. to 150° C., from 120° C. to 145° C., from 120° C. to 140° C., from 120° C. to 135° C., from 120° C. to 130° C., from 120° C. to 125° C., from 125° C. to 150° C., from 125° C. to 145° C., from 125° C. to 140° C., from 125° C. to 135° C., from 125° C. to 130° C., from 130° C. to 150° C., from 130° C. to 145° C. from 130° C. to 140° C., from 130° C. to 135° C., from 135° C. to 150° C., from 135° C. to 145° C., from 135° C. to 140° C., from 140° C. to 150° C., from 140° C. to 145° C., or from 145° C. to 150° C.

In embodiments, the fouling inhibitor may include low density polyethylene, high density polyethylene, silica, or combinations thereof. In embodiments, the silica may include hydrophobic fumed silica powder. In embodiments, the silica may have a base silica surface area from 100 to 200 square meters per gram ($m^2/g$), from 100 to 170 $m^2/g$, from 100 to 150 $m^2/g$, from 100 to 130 $m^2/g$, from 100 to 115 $m^2/g$, from 115 to 200 $m^2/g$, from 115 to 170 $m^2/g$, from 115 to 150 $m^2/g$, from 115 to 130 $m^2/g$, from 130 to 200 $m^2/g$, from 130 to 170 $m^2/g$, from 130 to 150 $m^2/g$, from 150 to 200 $m^2/g$, from 150 to 170 $m^2/g$, from 170 to 200 $m^2/g$, or of about 130 $m^2/g$.

In embodiments, the fouling inhibitor may have a chemical composition similar to the polymer formed as a byproduct in the reaction. That is, in embodiments, the fouling inhibitor may include polyethylene. In embodiments, the fouling inhibitor may include polyethylene homopolymer.

Conventional methods for reducing fouling utilizing a fouling inhibitor may include greater than 100 weight percent (wt. %), greater than 130 wt. %, greater than 500 wt. %, greater than 1000 wt. %, or greater than 1500 wt. % fouling inhibitor present based on a total amount of polymer byproduct formed. Methods for reducing fouling utilizing greater than 100 wt. % fouling inhibitor present based on a total amount of polymer formed may not be as efficient or effective as methods including less than 100 wt. % fouling inhibitor based on a total amount of polymer formed.

According to embodiments, the fouling inhibitor may be present in an amount ranging from 2 to 30 wt. % based on a total amount of polymer byproduct formed. The total amount of polymer formed may be determined through experimental means (such as by performing the oligomerization operation and collecting and weighing the amount of polymer byproduct formed). In embodiments, the fouling inhibitor may be present in an amount ranging from 8 to 12 wt. % based on a total amount of polymer byproduct formed. In embodiments, the fouling inhibitor may be present in an amount ranging from 1 to 100 wt. %, from 1 to 75 wt. %, from 1 to 50 wt. %, from 1 to 40 wt. %, from 1 to 30 wt. %, from 1 to 25 wt. %, from 1 to 20 wt. %, from 1 to 15 wt. %, from 1 to 12 wt. %, from 1 to 10 wt. %, from 1 to 8 wt. %, from 1 to 6 wt. %, from 1 to 4 wt. %, from 1 to 2 wt. %, from 2 to 100 wt. %, from 2 to 75 wt. %, from 2 to 50 wt. %, from 2 to 40 wt. %, from 2 to 30 wt. %, from 2 to 25 wt. %, from 2 to 20 wt. %, from 2 to 15 wt. %, from 2 to 12 wt. %, from 2 to 10 wt. %, from 2 to 8 wt. %, from 2 to 6 wt. %, from 2 to 4 wt. %, from 4 to 100 wt. %, from 4 to 75 wt. %, from 4 to 50 wt. %, from 4 to 40 wt. %, from 4 to 30 wt. %, from 4 to 25 wt. %, from 4 to 20 wt. %, from 4 to 15 wt. %, from 4 to 12 wt. %, from 4 to 10 wt. %, from 4 to 8 wt. %, from 4 to 6 wt. %, from 6 to 100 wt. %, from 6 to 75 wt. %, from 6 to 50 wt. %, from 6 to 40 wt. %, from 6 to 30 wt. %, from 6 to 25 wt. %, from 6 to 20 wt. %, from 6 to 15, wt. %, from 6 to 12 wt. %, from 6 to 10 wt. %, from 6 to 8 wt. %, from 8 to 100 wt. %, from 8 to 75 wt. %, from 8 to 50 wt. %, from 8 to 40 wt. %, from 8 to 30 wt. %, from 8 to 25 wt. %, from 8 to 20 wt. %, from 8 to 15 wt. %, from 8 to 12 wt. %, from 8 to 10 wt. %, from 10 to 100 wt. %, from 10 to 75 wt. %, from 10 to 50 wt. %, from 10 to 40 wt. %, from 10 to 30 wt. %, from 10 to 25 wt. %, from 10 to 20 wt. %, from 10 to 15 wt. %, from 10 to 12 wt. %, from 12 to 100 wt. %, from 12 to 75 wt. %, from 12 to 50 wt. %, from 12 to 40 wt. %, from 12 to 30 wt. %, from 12 to 25 wt. %, from 12 to 20 wt. %, from 12 to 15 wt. %, from 15 to 100 wt. %, from 15 to 75 wt. %, from 15 to 50 wt. %, from 15 to 40 wt. %, from 15 to 30 wt. %, from 15 to 25 wt. %, from 15 to 20 wt. %, from 20 to 100 wt. %, from 20 to 75 wt. %, from 20 to 50 wt. %, from 20 to 40 wt. %, from 20 to 30 wt. %, from 20 to 25 wt. %, from 25 to 100 wt. %, from 25 to 75 wt. %, from 25 to 50 wt. %, from 25 to 40 wt. %, from 25 to 30 wt. %, from 30 to 100 wt. %, from 30 to 75 wt. %, from 30 to 50 wt. %, from 30 to 40 wt. %, from 40 to 100 wt. %, from 40 to 75 wt. %, from 40 to 50 wt. %, from 50 to 100 wt. %, from 50 to 75 wt. %, or from 75 to 100 wt. % based on a total amount of polymer byproduct formed.

As stated previously, in embodiments, the fouling inhibitor may have a particle size $D_{50}$ of less than 100 μm. Particle size (D) values, such as $D_{10}$, $D_{50}$ and $D_{90}$ may be used throughout this disclosure to represent the midpoint and range of the particle sizes of the fouling inhibitor. Particle size distributions may be calculated based on sieve analysis results by creating an S-curve of cumulative mass retained against sieve mesh size, and calculating the intercepts for 10%, 50% and 90% mass, which correlate to the $D_{10}$, $D_{50}$ and $D_{90}$ values, respectively. Each D value represents the particle size which, when all fouling inhibitor particles are arranged in order of ascending mass, divides the mass into specified percentages. The percentage mass below the diameter of interest is the number expressed after the "D". For example, $D_{10}$ is the particle size at which 10% of the fouling inhibitor's mass is comprised of smaller particles, and $D_{50}$ is the particle size at which 50% of the fouling inhibitor's mass is comprised of smaller particles. $D_{50}$ may also be referred to as the "mass median diameter" because it divides the sample equally by mass.

In conventional methods for reducing fouling in an oligomerization reactor, fouling inhibitors having a particle size $D_{50}$ of greater than 100 μm, greater than 200 μm, or greater than 500 μm may be used. However, methods for reducing fouling utilizing a fouling inhibitor with particle sizes $D_{50}$ greater than 100 μm may not be as efficient or effective as utilizing fouling inhibitors with particle sizes $D_{50}$ of less than 100 μm. In embodiments, the fouling inhibitor may have a particle size $D_{50}$ of less than 45 μm. In embodiments, the fouling inhibitor may have a particle size $D_{50}$ of less than 100 μm, less than 75 μm, less than 50 μm, less than 45 μm, less than 40 μm, less than 35 μm, less than 30 μm, less than 25 μm, less than 22 μm, less than 20 μm, less than 15 μm, or less than 10 μm. In embodiments, the fouling inhibitor may have a particle size $D_{50}$ that ranges from 10 to 100 μm, from 10 to 75 μm, from 10 to 50 μm, from 10 to 45 μm, from 10 to 40 μm, from 10 to 35 μm, from 10 to 30 μm, from 10 to 25 μm, from 10 to 22 μm, from 10 to 20 μm, from 10 to 15 μm, from 15 to 100 μm, from 15 to 75 μm, from 15 to 50 μm, from 15 to 45 μm, from 15 to 40 μm, from 15 to 35 μm, from 15 to 30 μm, from 15 to 25 μm, from 15 to 22 μm, from 15 to 20 μm, from 20 to 100 μm, from 20 to 75 μm, from 20 to 50 μm, from 20 to 45 μm, from 20 to 40 μm, from 20 to 35 μm, from 20 to 30 μm, from 20 to 25 μm, from 20 to 22 μm, from 22 to 100 μm, from 22 to 75 μm, from 22 to 50 μm, from 22 to 45 μm, from 22 to 40 μm, from 22 to 35 μm, from 22 to 30 μm, from 22 to 25 μm, from 25 to 100 μm, from 25 to 75 μm, from 25 to 50 μm, from 25 to 45 μm, from 25 to 40 μm, from 25 to 35 μm, from 25 to 30 µm, from 30 to 100 µm, from 30 to 75 µm, from 30 to 50 µm, from 30 to 45 µm, from 30 to 40 µm, from 30 to 35 µm, from 35 to 100 µm, from 35 to 75 µm, from 35 to 50 µm, from 35 to 45 µm, from 35 to 40 µm, from 40 to 100 µm, from 40 to 75 µm, from 40 to 50 µm, from 40 to 45 µm, from 45 to 100 µm, from 45 to 75 µm, from 45 to 50 µm, from 50 to 100 µm, from 50 to 75 µm, or from 75 to 100 µm.

In embodiments, the fouling inhibitor may have a particle size $D_{10}$ of less than 25 µm. In embodiments, the fouling inhibitor may have a particle size $D_{10}$ of less than 75 µm, less than 50 µm, less than 30 µm, less than 25 µm, less than 22 µm, less than 20 µm, less than 17 µm, less than 15 µm, less than 12 µm, less than 10 µm, less than 7 µm, or less than 5 µm. In embodiments, the fouling inhibitor may have a particle size $D_{10}$ that ranges from 5 to 75 µm, from 5 to 50 µm, from 5 to 30 µm, from 5 to 25 µm, from 5 to 22 µm, from 5 to 20 µm, from 5 to 17 µm, from 5 to 15 µm, from 5 to 12 µm, from 5 to 10 µm, from 5 to 7 µm, from 7 to 75 µm, from 7 to 50 µm, from 7 to 30 µm, from 7 to 25 µm, from 7 to 22 µm, from 7 to 20 µm, from 7 to 17 µm, from 7 to 15 µm, from 7 to 12 µm, from 7 to 10 µm, from 10 to 75 µm, from 10 to 50 µm, from 10 to 30 µm, from 10 to 25 µm, from 10 to 22 µm, from 10 to 20 µm, from 10 to 17 µm, from 10 to 15 µm, from 10 to 12 µm, from 12 to 75 µm, from 12 to 50 µm, from 12 to 30 µm, from 12 to 25 µm, from 12 to 22 µm, from 12 to 20 µm, from 12 to 17 µm, from 12 to 15 µm, from 15 to 75 µm, from 15 to 50 µm, from 15 to 30 µm, from 15 to 25 µm, from 15 to 22 µm, from 15 to 20 µm, from 15 to 17 µm, from 17 to 75 µm, from 17 to 50 µm, from 17 to 30 µm, from 17 to 25 µm, from 17 to 22 µm, from 17 to 20 µm, from 20 to 75 µm, from 20 to 50 µm, from 20 to 30 µm, from 20 to 25 µm, from 20 to 22 µm, from 22 to 75 µm, from 22 to 50 µm, from 22 to 30 µm, from 22 to 25 µm, from 25 to 75 µm, from 25 to 50 µm, from 25 to 30 µm, from 30 to 100 µm, from 30 to 75 µm, from 30 to 50 µm, or from 50 to 75 µm.

In embodiments, the fouling inhibitor may have a particle size $D_{90}$ of less than 100 µm. In embodiments, the fouling inhibitor may have a particle size $D_{90}$ of less than 1000 µm, less than 800 µm, less than 700 µm, less than 600 µm, less than 500 µm, less than 400 µm, less than 300 µm, less than 200 µm, less than 150 µm, less than 100 µm, less than 75 µm, less than 50 µm, less than 49 µm, less than 45 µm, less than 40 µm, less than 35 µm, less than 30 µm, or less than 25 µm. In embodiments, the fouling inhibitor may have a particle size $D_{90}$ that ranges from 45 to 1000 µm, from 45 to 800 µm, from 45 to 700 µm, from 45 to 600 µm, from 45 to 500 µm, from 45 to 400 µm, from 45 to 300 µm, from 45 to 200 µm, from 45 to 150 µm, from 45 to 100 µm, from 45 to 50 µm, from 50 to 1000 µm, from 50 to 800 µm, from 50 to 700 µm, from 50 to 600 µm, from 50 to 500 µm, from 50 to 400 µm, from 50 to 300 µm, from 50 to 200 µm, from 50 to 150 µm, from 50 to 100 µm, from 100 to 1000 µm, from 100 to 800 µm, from 100 to 700 µm, from 100 to 600 µm, from 100 to 500 µm, from 100 to 400 µm, from 100 to 300 µm, from 100 to 200 µm, from 100 to 150 µm, from 150 to 1000 µm, from 150 to 800 µm, from 150 to 700 µm, from 150 to 600 µm, from 150 to 500 µm, from 150 to 400 µm, from 150 to 300 µm, from 150 to 200 µm, from 200 to 1000 µm, from 200 to 800 µm, from 200 to 700 µm, from 200 to 600 µm, from 200 to 500 µm, from 200 to 400 µm, from 200 to 300 µm, from 300 to 1000 µm, from 300 to 800 µm, from 300 to 700 µm, from 300 to 600 µm, from 300 to 500 µm, from 300 to 400 µm, from 400 to 1000 µm, from 400 to 800 µm, from 400 to 700 µm, from 400 to 600 µm, from 400 to 500 µm, from 500 to 1000 µm, from 500 to 800 µm, from 500 to 700 µm, from 500 to 600 µm, from 600 to 1000 µm, from 600 to 800 µm, from 600 to 700 µm, from 700 to 1000 µm, from 700 to 800 µm, or from 800 to 1000 µm.

In embodiments, the fouling inhibitor may have a particle size distribution/spread from 0.1 to 10, where the particle size distribution/spread is calculated by subtracting $D_{10}$ from $D_{90}$ and dividing the difference by $D_{50}$. In embodiments, the fouling inhibitor may have a particle size distribution/spread from 0.1 to 8, from 0.1 to 6, from 0.1 to 4, from 0.1 to 3, from 0.1 to 2.0, from 0.1 to 1.8, from 0.1 to 1.6, from 0.1 to 1.4, from 0.1 to 1.2, from 0.1 to 1.0, from 0.1 to 0.5, from 0.5 to 10, from 0.5 to 8, from 0.5 to 6, from 0.5 to 4, from 0.5 to 3, from 0.5 to 2.0, from 0.5 to 1.8, from 0.5 to 1.6, from 0.5 to 1.4, from 0.5 to 1.2, from 0.5 to 1.0, from 0.5 to 10, from 1.0 to 10, from 1.0 to 8, from 1.0 to 6, from 1.0 to 4, from 1.0 to 3, from 1.0 to 2.0, from 1.0 to 1.8, from 1.0 to 1.6, from 1.0 to 1.4, from 1.0 to 1.2, from 1.2 to 10, from 1.2 to 8, from 1.2 to 6, from 1.2 to 4, from 1.2 to 3, from 1.2 to 2.0, from 1.2 to 1.8, from 1.2 to 1.6, from 1.2 to 1.4, from 1.4 to 10, from 1.4 to 8, from 1.4 to 6, from 1.4 to 4, from 1.4 to 3, from 1.4 to 2.0, from 1.4 to 1.8, from 1.4 to 1.6, from 1.6 to 10, from 1.6 to 8, from 1.6 to 6, from 1.6 to 4, from 1.6 to 3, from 1.6 to 2.0, from 1.6 to 1.8, from 1.8 to 10, from 1.8 to 8, from 1.8 to 6, from 1.8 to 4, from 1.8 to 3, from 1.8 to 2.0, from 2.0 to 10, from 2.0 to 8, from 2.0 to 6, from 2.0 to 4, from 2.0 to 3, from 3 to 10, from 3 to 8, from 3 to 6, from 3 to 4, from 4 to 10, from 4 to 8, from 4 to 6, from 6 to 10, from 6 to 8, or from 8 to 10.

As stated previously, the fouling inhibitor changes the morphology of the polymer formed during the oligomerization process. In embodiments, changing the morphology of the polymer formed during the oligomerization process may include changing the polymer particle shape or size.

As previously described, polymer may be formed as a byproduct during the oligomerization process and may precipitate in the reactor, ultimately leading to fouling polymer. The methods disclosed herein reduce the propensity of the polymer formed during the oligomerization process to foul the reactor. Furthermore, as stated previously, methods for reducing fouling utilizing a fouling inhibitor with particle sizes $D_{50}$ of greater than 100 µm may not be as efficient or effective as utilizing fouling inhibitors with particle sizes $D_{50}$ of less than 100 µm. In the embodiments described herein, fouling inhibitors with particle sizes $D_{50}$ of less than 100 µm are used, and result in a lower weight percent of fouling polymer present based on a total amount of polymer byproduct formed and fouling inhibitor added than the weight percent of fouling polymer present when utilizing a fouling inhibitor with particle sizes $D_{50}$ of greater than 100 µm.

In embodiments, the fouling polymer may be present in an amount less than 24 wt. % based on a total amount of polymer formed and fouling inhibitor added. In embodiments, the fouling polymer may be present in an amount less than 15 wt. % based on a total amount of polymer formed and fouling inhibitor added. In embodiments, the fouling polymer may be present in an amount less than 40 wt. %, less than 30 wt. %, less than 25 wt. %, less than 24 wt. %, less than 20 wt. %, less than 15 wt. %, less than 14 wt. %, less than 13 wt. %, less than 10 wt. %, less than 8 wt. %, less than 7 wt. %, less than 5 wt. %, or less than 4 wt. % based on a total amount of polymer formed and fouling inhibitor added. In embodiments, the fouling polymer may be present in an amount less than 40 wt. %, less than 30 wt. %, less than 25 wt. %, less than 24 wt. %, less than 20 wt. %, less than 15 wt. %, less than 14 wt. %, less than 13 wt. %, less than 10 wt. %, less than 8 wt. %, less than 7 wt. %, less than 5 wt. %, less than 4 wt. %, less than 3 wt. %, less than 2 wt.

%, less than 1.5 wt. %, or less than 1 wt. % based on a total amount of polymer formed and fouling inhibitor added. In embodiments, the fouling polymer may be present in an amount ranging from 0.5 to 40 wt. %, from 0.5 to 40 wt. %, from 0.5 to 30 wt. %, from 0.5 to 25 wt. %, from 0.5 to 24 wt. %, from 0.5 to 20 wt. %, from 0.5 to 15 wt. %, from 0.5 to 14 wt. %, from 0.5 to 13 wt. %, from 0.5 to 10 wt. %, from 0.5 to 8 wt. %, from 0.5 to 7 wt. %, from 0.5 to 5 wt. %, from 0.5 to 4 wt. %, from 0.5 to 3 wt. %, from 0.5 to 2 wt. %, from 0.5 to 1.5 wt. %, from 0.5 to 1 wt. %, from 1 to 40 wt. %, from 1 to 40 wt. %, from 1 to 30 wt. %, from 1 to 25 wt. %, from 1 to 24 wt. %, from 1 to 20 wt. %, from 1 to 15 wt. %, from 1 to 14 wt. %, from 1 to 13 wt. %, from 1 to 10 wt. %, from 1 to 8 wt. %, from 1 to 7 wt. %, from 1 to 5 wt. %, from 1 to 4 wt. %, from 1 to 3 wt. %, from 1 to 2 wt. %, from 1 to 1.5 wt. %, from 1.5 to 40 wt. %, from 1.5 to 40 wt. %, from 1.5 to 30 wt. %, from 1.5 to 25 wt. %, from 1.5 to 24 wt. %, from 1.5 to 20 wt. %, from 1.5 to 15 wt. %, from 1.5 to 14 wt. %, from 1.5 to 13 wt. %, from 1.5 to 10 wt. %, from 1.5 to 8 wt. %, from 1.5 to 7 wt. %, from 1.5 to 5 wt. %, from 1.5 to 4 wt. %, from 1.5 to 3 wt. %, from 1.5 to 2 wt. %, from 2 to 40 wt. %, from 2 to 40 wt. %, from 2 to 30 wt. %, from 2 to 25 wt. %, from 2 to 24 wt. %, from 2 to 20 wt. %, from 2 to 15 wt. %, from 2 to 14 wt. %, from 2 to 13 wt. %, from 2 to 10 wt. %, from 2 to 8 wt. %, from 2 to 7 wt. %, from 2 to 5 wt. %, from 2 to 4 wt. %, from 2 to 3 wt. %, from 3 to 40 wt. %, from 3 to 40 wt. %, from 3 to 30 wt. %, from 3 to 25 wt. %, from 3 to 24 wt. %, from 3 to 20 wt. %, from 3 to 15 wt. %, from 3 to 14 wt. %, from 3 to 13 wt. %, from 3 to 10 wt. %, from 3 to 8 wt. %, from 3 to 7 wt. %, from 3 to 5 wt. %, from 3 to 4 wt. %, from 4 to 40 wt. %, from 4 to 30 wt. %, from 4 to 25 wt. %, from 4 to 24 wt. %, from 4 to 20 wt. %, from 4 to 15 wt. %, from 4 to 14 wt. %, from 4 to 13 wt. %, from 4 to 10 wt. %, from 4 to 8 wt. %, from 4 to 7 wt. %, from 4 to 5 wt. %, from 5 to 40 wt. %, from 5 to 30 wt. %, from 5 to 25 wt. %, from 5 to 24 wt. %, from 5 to 20 wt. %, from 5 to 15 wt. %, from 5 to 14 wt. %, from 5 to 13 wt. %, from 5 to 10 wt. %, from 5 to 8 wt. %, from 5 to 7 wt. %, from 7 to 40 wt. %, from 7 to 30 wt. %, from 7 to 25 wt. %, from 7 to 24 wt. %, from 7 to 20 wt. %, from 7 to 15 wt. %, from 7 to 14 wt. %, from 7 to 13 wt. %, from 7 to 10 wt. %, from 7 to 8 wt. %, from 8 to 40 wt. %, from 8 to 30 wt. %, from 8 to 25 wt. %, from 8 to 24 wt. %, from 8 to 20 wt. %, from 8 to 15 wt. %, from 8 to 14 wt. %, from 8 to 13 wt. %, from 8 to 10 wt. %, from 10 to 40 wt. %, from 10 to 30 wt. %, from 10 to 25 wt. %, from 10 to 24 wt. %, from 10 to 20 wt. %, from 10 to 15 wt. %, from 10 to 14 wt. %, from 10 to 13 wt. %, from 13 to 40 wt. %, from 13 to 30 wt. %, from 13 to 25 wt. %, from 13 to 24 wt. %, from 13 to 20 wt. %, from 13 to 15 wt. %, from 13 to 14 wt. %, from 14 to 40 wt. %, from 14 to 30 wt. %, from 14 to 25 wt. %, from 14 to 24 wt. %, from 14 to 20 wt. %, from 14 to 15 wt. %, from 15 to 40 wt. %, from 15 to 30 wt. %, from 15 to 25 wt. %, from 15 to 24 wt. %, from 15 to 20 wt. %, from 20 to 40 wt. %, from 20 to 30 wt. %, from 20 to 25 wt. %, from 20 to 24 wt. %, from 24 to 40 wt. %, from 24 to 30 wt. %, from 24 to 25 wt. %, from 25 to 40 wt. %, from 25 to 30 wt. %, or from 30 to 40 wt. % based on a total amount of polymer formed and fouling inhibitor added.

EXAMPLES

A method for reducing fouling in an oligomerization reactor as described herein was conducted utilizing various fouling inhibitors. For each experiment, a 600 milliLiter (mL) stainless steel Parr Series 4540 reactor in a nitrogen-filled glove box was charged with 80 mL methylcyclohexane solvent, 4 micromoles (μmol) Cr N-(diphenylphosphanyl)-N-isopropyl-1,1-diphenylphosphanamine (PNP) precatalyst solution, 600 molar eq modified methylaluminoxane, type 3A (MMAO-3A) based on the amount of Cr added in the reactor, and fouling inhibitor.

Various fouling inhibitors were used in examples. Specifically, high-density polyethylene (HDPE), gas-phase HDPE, low-density polyethylene (LDPE), and Cab-o-sil® TS-610 available from Cabot Corporation. The HDPE has a particle size $D_{10}$ of 15 μm, $D_{50}$ of 37 μm, and $D_{90}$ of 78 μm. The particle size distribution/spread of the HDPE is 1.7, where the particle size distribution/spread is calculated by subtracting $D_{10}$ from $D_{90}$ and dividing the difference by $D_{50}$. The LDPE has a particle size $D_{10}$ of 21 μm, $D_{50}$ of 45 μm, and $D_{90}$ of 92 μm. The particle size distribution/spread of the LDPE is 1.57. The type and amount of fouling inhibitor added is shown in Table 1 (continued) below. The gas-phase HDPE has a particle size $D_{10}$ of 295 μm, $D_{50}$ of 752 μm, and $D_{90}$ of 1660 μm. The particle size distribution/spread gas-phase HDPE is 1.82.

The reactor was then sealed and connected to a 600 psi ethylene feed in a fume hood. The feed was flushed with nitrogen for one minute and the sealed Parr reactor was heated to 55° C. The heating mantle was removed and the ethylene feed was opened. An immediate temperature rise was observed. The reaction was maintained at 60° C.-66° C. for 30 minutes. The reaction was then cooled to ambient temperature and the remaining ethylene was released. The reactor was then returned to the glove box and the total amount of solvent was measured. Gas chromatography analysis of an aliquot was used to calculate efficiency as well as the $C_8/C_6$ ratio.

The reactor was then opened and all contents of the reactor were dumped into a collecting vessel. Fouling polymer that was still in the reactor or present on the agitator was collected, dried, and weighed. This weight is shown in Table 1 (continued) below as the fouling polymer amount. The contents of the collecting vessel were filtered and the remaining suspended polymer was collected, dried, and weighed. This weight is shown in Table 1 (continued) below as the slurry polymer amount. The combination of the amount of fouling polymer and the amount of slurry polymer minus the amount of added fouling inhibitor is shown in Table 1 (continued) below as the amount of total polymer formed. The amount of total polymer formed is shown in Table 1 below as a weight fraction of the total weight of products formed during the ethylene tetramerization reaction.

TABLE 1

| Run | Fouling Inhibitor | Efficiency (g/gCr) | Amount of $C_6$ formed (g) | Amount of $C_8$ formed (g) | $C_8/C_6$ ratio | Polymer wt. % of total product |
|---|---|---|---|---|---|---|
| 1 | None | 30,000 | 26 | 74 | 2.9 | 1.3 |
| 2 | None | Not measured | Not measured | Not measured | Not measured | Not measured |

TABLE 1-continued

| | | | | | | |
|---|---|---|---|---|---|---|
| 3 | HDPE | 610,000 | 31 | 89 | 2.8 | 0.72 |
| 4 | HDPE | 470,000 | 24 | 66 | 2.8 | 1.5 |
| 5 | Gas-phase HDPE | 480,000 | 23 | 68 | 2.9 | 1.3 |
| 6 | Gas-phase HDPE | 460,000 | 21 | 66 | 3.1 | 1.3 |
| 7 | LDPE | 433,000 | 20 | 63 | 3.2 | 1.3 |
| 8 | LDPE | 440,000 | 20 | 64 | 3.1 | 1.5 |
| 9 | Cab-o-sil® TS-610 | 414,000 | 18 | 61 | 3.3 | 1.0 |
| 10 | HDPE | Not measured | Not measured | Not measured | Not measured | Not measured |
| 11 | HDPE | Not measured | Not measured | Not measured | Not measured | Not measured |

| Run | Fouling Inhibitor | Particle size $D_{50}$ (μm) | Amount of fouling inhibitor added (mg) | Fouling inhibitor/ Formed polymer (wt. %) | Fouling inhibitor/ reactor contents (wt. %) | Total polymer formed (g) | Amount of fouling polymer collected (g) | Amount of fouling polymer collected (wt. %) |
|---|---|---|---|---|---|---|---|---|
| 1 | None | — | — | — | — | 0.91 | 0.39 | 43 |
| 2 | None | — | — | — | — | 1.5 | 0.60 | 40 |
| 3 | HDPE | 37 | 60 | 2 | 0.10 | 2.8 | 0.08 | 3 |
| 4 | HDPE | 37 | 160 | 11 | 0.26 | 1.5 | 0.07 | 4 |
| 5 | Gas-phase HDPE | 750 | 140 | 9 | 0.23 | 1.5 | 0.44 | 27 |
| 6 | Gas-phase HDPE | 750 | 140 | 10 | 0.23 | 1.4 | 0.37 | 24 |
| 7 | LDPE | 45 | 130 | 10 | 0.21 | 1.3 | <0.1 | <1 |
| 8 | LDPE | 45 | 140 | 9 | 0.23 | 1.5 | <0.1 | <1 |
| 9 | Cab-o-sil® TS-610 | 0.2-0.3 | 107 | 11 | 0.17 | 1.0 | 0.14 | 13 |
| 10 | HDPE | 37 | 202 | 20 | 0.33 | 1.0 | 0.05 | 4 |
| 11 | HDPE | 37 | 300 | 30 | 0.49 | 1.0 | 0.05 | 4 |

The efficiency, amount of $C_6$ formed, the amount of Cs formed, the $C_8/C_6$ ratio, and the polymer wt. % of total product was not measured for runs 10 and 11 because these runs were added later to provide a wider range of HDPE fouling inhibitor amounts to determine effectiveness at preventing fouling polymer formation.

The addition of fouling inhibitor drastically decreased the amount of fouling polymer observed in each experiment. It was noted that the experiments that resulted in the least amount of fouling polymer were those experiments in which small particle size HDPE or LDPE were used as the fouling inhibitor.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method for reducing fouling in an oligomerization reactor, comprising:
   oligomerizing $C_2$ to $C_4$ hydrocarbons within the oligomerization reactor in the presence of a fouling inhibitor having a particle size $D_{50}$ of less than 100 μm; and
   forming linear alpha olefins and olefin polymer mixture, wherein the fouling inhibitor changes the size and/or shape of the olefin polymer mixture.

2. The method of claim 1, wherein the fouling inhibitor is present in an amount ranging from 2 wt. % to 30 wt. % based on a total amount of olefin polymer mixture formed.

3. The method of claim 1, wherein the fouling inhibitor is present in an amount ranging from 8 wt. % to 12 wt. % based on a total amount of olefin polymer mixture formed.

4. The method of claim 1, wherein the fouling inhibitor is selected from low density polyethylene, high density polyethylene, silica, or combinations thereof.

5. The method of claim 1, wherein the particle size $D_{50}$ is less than or equal to 45 μm.

6. The method of claim 1, wherein:
   the $C_2$ to $C_4$ olefin is selected from ethylene, butadiene, or both; and
   the oligomerization reactor operates at a temperature of less than 100° C.

7. The method of claim 6, wherein oligomerizing ethylene produces 1-hexene, 1-octene, or combinations thereof.

8. The method of claim 6, wherein the ethylene oligomerization comprises a tetramerization process.

9. The method of claim 1, wherein the olefin polymer mixture comprises polyethylene.

10. The method of claim 1, wherein fouling polymer is present in an amount less than 24 wt. % based on a total amount of olefin polymer mixture formed and fouling inhibitor added.

11. A method for reducing fouling in an oligomerization reactor, comprising:
oligomerizing ethylene in the oligomerization reactor in the presence of a fouling inhibitor having a particle size $D_{50}$ of less than 100 μm; and
forming linear alpha olefins and polyethylene during the oligomerization, wherein the fouling inhibitor changes the morphology of the polyethylene.

12. The method of claim 11, wherein the fouling inhibitor is present in an amount ranging from 8 wt. % to 12 wt. % based on a total amount of polyethylene formed and fouling inhibitor added.

13. The method of claim 11, wherein the fouling inhibitor comprises low density polyethylene where the particle size $D_{50}$ is less than or equal to 45 μm.

14. The method of claim 11, wherein:
the ethylene oligomerization process comprises a tetramerization process for converting ethylene to 1-octene; and
the oligomerization reactor operates at a temperature of less than 70° C.

15. The method of claim 11, wherein fouling polymer is present in an amount less than 2 wt. % based on a total amount of polyethylene formed and fouling inhibitor added.

* * * * *